July 22, 1952  J. G. LINDEMAN  2,604,176
TRACTOR FRAME STRUCTURE
Filed Oct. 25, 1948  3 Sheets-Sheet 1
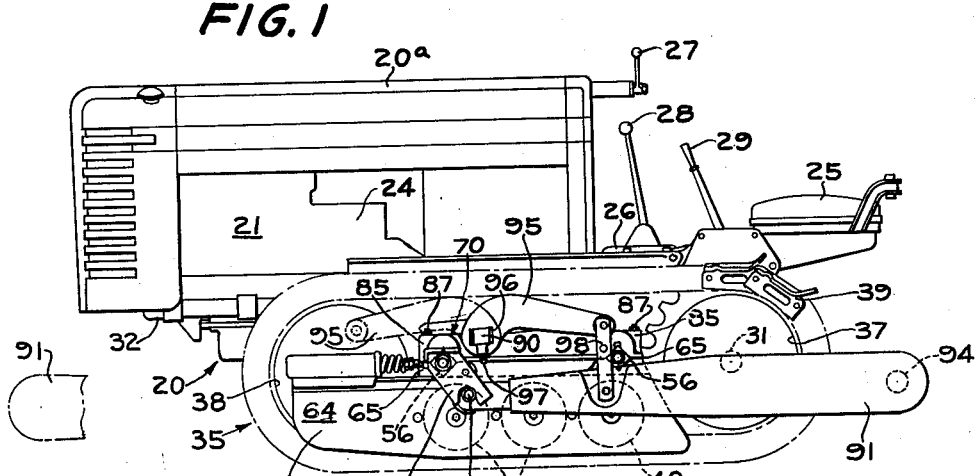
FIG. 1
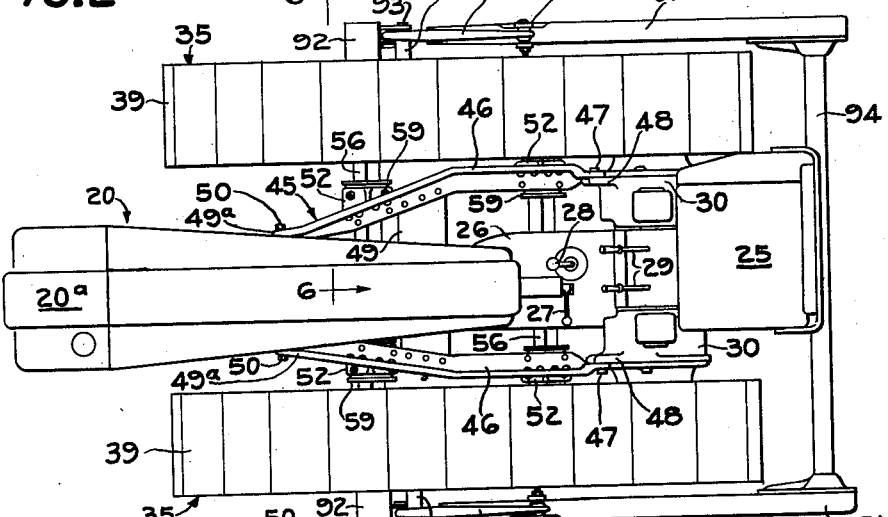
FIG. 2
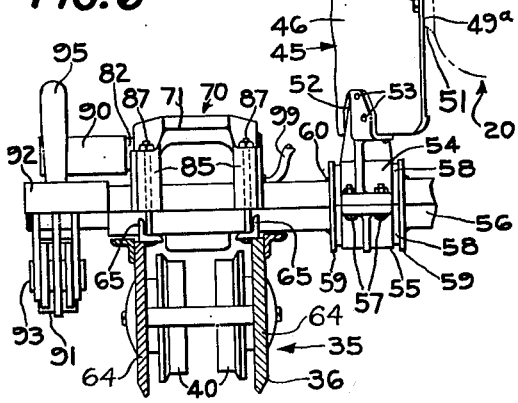
FIG. 6
FIG. 5
INVENTOR.
J. G. LINDEMAN
BY
ATTORNEYS July 22, 1952  J. G. LINDEMAN  2,604,176
TRACTOR FRAME STRUCTURE
Filed Oct. 25, 1948  3 Sheets-Sheet 2
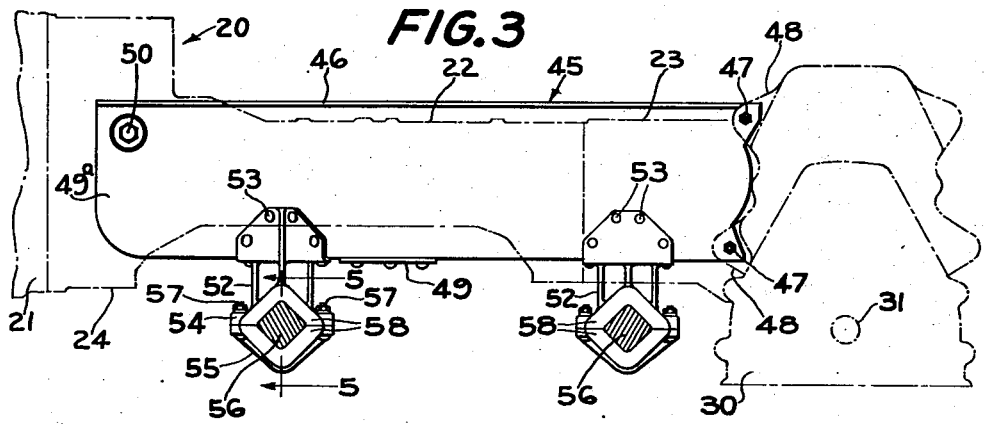
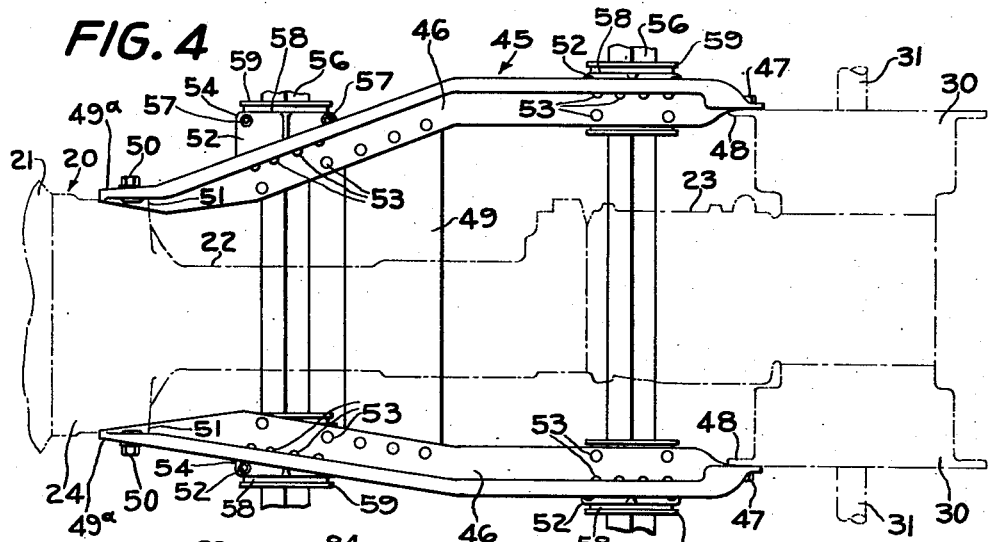
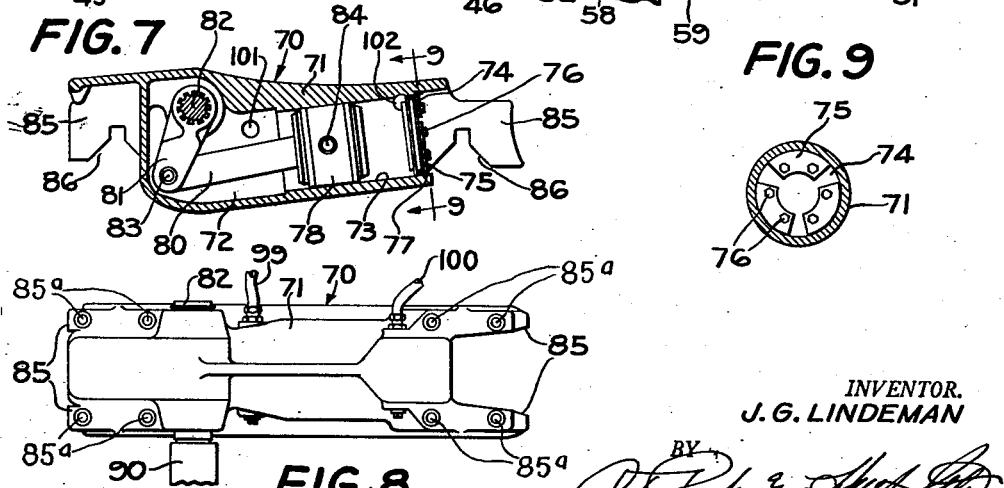
INVENTOR.
J. G. LINDEMAN
BY
ATTORNEYS July 22, 1952        J. G. LINDEMAN        2,604,176
TRACTOR FRAME STRUCTURE
Filed Oct. 25, 1948        3 Sheets-Sheet 3
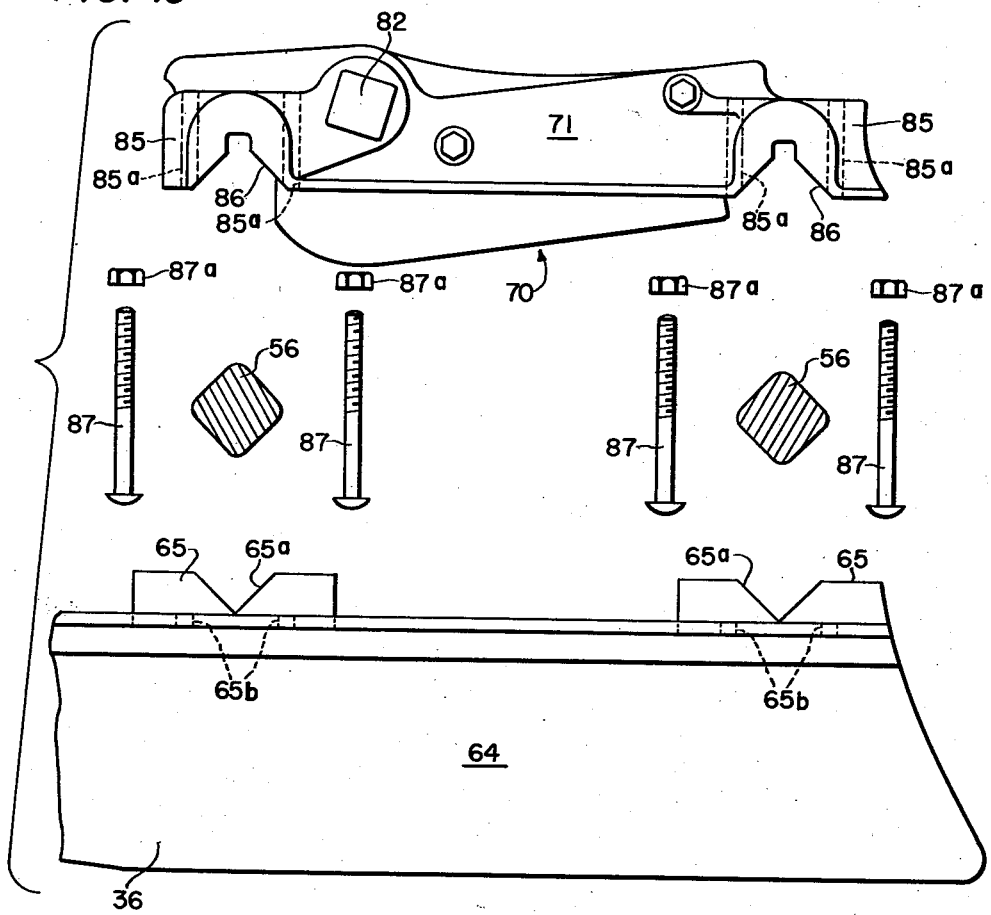
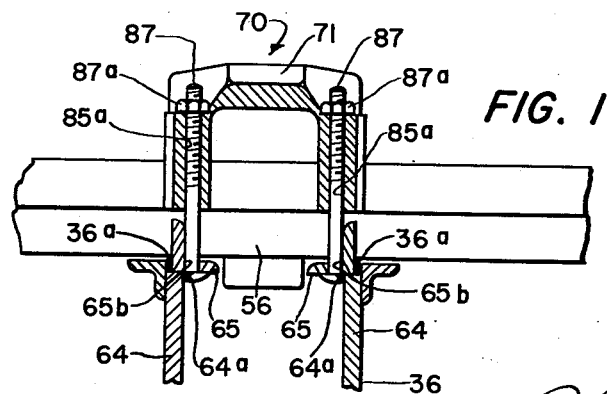
INVENTOR.
J. G. LINDEMAN
ATTORNEYS Patented July 22, 1952

2,604,176

UNITED STATES PATENT OFFICE 2,604,176

TRACTOR FRAME STRUCTURE

Jesse G. Lindeman, Yakima, Wash., assignor, by mesne assignments, to Deere & Company, Moline, Ill., a corporation of Illinois Application October 25, 1948, Serial No. 56,295

8 Claims. (Cl. 180—9.1)

This invention relates to a tractor and more particularly to frame structure and attachment means therefor.

In certain instances, a manufacturer will find it desirable to provide a series of tractors of similar basic design but including different types of wheel tractors and track-laying tractors. There are certain important fundamental differences between a wheel tractor and a track-laying tractor and it is not ordinarily an easy matter to provide structure of a basic design that can be common to both types of tractors for the purpose of converting one tractor to another. An important object of the present invention is to provide conversion means for adapting the body structure of a basic type of wheel tractor to track-type traction units so that the tractor may be used as a crawler. It is an object of the invention in this respect to utilize to as great an extent as possible the basic features of the wheel-type tractor so that the conversion from one type of tractor to the other may be easily accomplished. A feature of the invention is the conversion frame by means of which a basic design of unitary tractor body is sustained on a pair of track-type traction units.

Further objects of the invention reside in the structure of the conversion or attachment frame, particularly in the resilient or shock-absorbing mounting means employed between the traction units and the tractor body.

A further object of the invention is to provide improved means for mounting elements of the conversion frame to be sustained by the traction units and, particularly, to utilize securing means for an auxiliary power-transmitting device as part of the mounting means.

Further objects are to provide an improved mounting for such auxiliary power-transmitting device and to locate the device in a convenient place on the traction unit, whereby the invention in this respect may accomplish subsidiary objects residing in the use of certain portions of the conversion frame as mounting means for implements and the use of the power-transmitting device as means for adjusting such implements.

The foregoing and other important objects and desirable features inherent in and encompassed by the invention will become apparent to those versed in the art as a preferred form of the invention is fully disclosed in the following detailed description and accompanying sheets of drawings in which:

Figure 1 is a side elevational view of a crawler tractor equipped with the conversion frame and attachments therefor;

Figure 2 is a plan view of the same;

Figure 3 is a side elevational view of the conversion frame, shown with respect to the basic tractor body structure to which it is attached, the latter being indicated in broken lines;

Figure 4 is a plan view of the structure shown in Figure 3, these figures being drawn on an enlarged scale over that used in Figures 1 and 2;

Figure 5 is an enlarged fragmentary sectional view taken on the line 5—5 of Figure 3 and illustrating one of the shock-absorbing elements in the conversion frame;

Figure 6 is a fragmentary sectional view taken on the line 6—6 of Figure 2 and drawn to the scale of Figures 3 and 4;

Figure 7 is a longitudinal sectional view through the improved power-transmitting device;

Figure 8 is a plan view of the structure shown in Figure 7;

Figure 9 is a transverse sectional view taken on the line 9—9 of Figure 7.

Figure 10 is an exploded view, on an enlarged scale and in side elevation, showing the assembly details of a track frame and its power-transmitting device; and Figure 11 is an enlarged, fragmentary sectional view showing further details of the structure illustrated in Figures 6 and 10.

The tractor chosen for the purposes of illustration comprises a longitudinal main body 20 of the so-called frameless type made up of a forward part, a rearward part, and an intermediate part, these parts consisting respectively of a power plant, such as an internal combustion engine 21, an intermediate or connecting housing 22, and a main case 23. The intermediate housing 22 is enlarged at its forward end to provide a bell housing 24 which may house a conventional clutch (not shown) for connecting the engine 21 to the driving mechanism of the tractor. This bell housing, as is conventional, is rigidly secured to the rear part of the engine 21.

The main case 23 may contain conventional driving mechanism (not shown) including a transmission or differential or equivalent gear-reduction means; and the elongated portion of the intermediate housing 22 encloses a propeller shaft (not shown) interconnected between the engine clutch and the driving mechanism. The basic structure of the tractor described so far may follow generally that shown in U. S. Patent 2,340,134, issued to I. D. Maxon et al. on January 25, 1944, with the exception that the present body design does not have the frame members shown in the patent.

The forward portion of the body, including the engine 21 and intermediate housing 22, may carry conventional radiator grille and hood structure, designated generally by the numeral 20a. The hood structure terminates at its rear end just forwardly of the main case 23 and the latter is provided with an operator's station including a seat 25, a platform 26, and suitable controls 27, 28, and 29.

The main case 23 carries rigidly at each side thereof a secondary gear housing 30 within which may be contained conventional final drive gearing (not shown). These housings project laterally respectively at opposite sides of the main case 23 so that the transverse distance between the housings is substantially greater than the width of the forward part of the body 20, as will be apparent in Figure 4. Each housing carries a laterally outwardly extending drive shaft or axle 31 which, when the tractor is a conventional four-wheel tractor, is connected to a traction wheel of the usual type. In such case, the forward end of the body 20 may be supported on a rolling support including either a wide-tread wheeled axle or a narrow truck, examples of either being familiar to those versed in the art. Such front rolling supports would ordinarily be carried at the forward portion of the body 20, as at 32 (Figure 1).

In the conversion of the tractor for use of the body 20 in a track-type tractor, the body is carried between a pair of traction units, one at each side of the body and each designated generally by the numeral 35. Since these traction units are identical, or at least, symmetrical, the description of one will suffice for both.

Each traction unit includes a longitudinal supporting member or track frame 36, a pair of longitudinally spaced rotary elements, such as a rear drive sprocket 37 and a front idler 38, a traction element in the form of an endless track 39, and a plurality of track rollers 40. To the extent described, the traction unit may be similar to any well known track unit. Each driving sprocket 37 is connected in driving relationship to the proximate driving axle or member 31 (Figure 1) and the track frame 36 extends forwardly alongside the body to a point substantially intermediate the front and rear ends of the engine 21. The distance between the centers of the sprocket 37 and front idler 38 is substantially less than the wheel base of a conventional wheel tractor and there is considerable overhang of the forward portion of the body 20 as respects the traction units 35, as is typical in most crawler tractors.

The matter of carrying the body 20 on the traction unit 35 involves the provision of a sustaining means between the body and the track frame 36, whereby the weight of the tractor is carried on such means by means of the track frame, track rollers 40, and lower runs or flights of the tracks 39. According to the present invention, the sustaining means comprises a conversion frame indicated generally by the numeral 45. The conversion frame includes a pair of laterally spaced, generally longitudinally running frame members 46, one at each side of the tractor body 20. Each member 46 is appropriately constructed as an angle member having horizontal and vertical flanges, the latter of which is of substantial dimension vertically. The rear end portion of the vertical flange of each member 46 is appropriately apertured at vertically spaced points to receive bolts or cap screws 47 which provide means for securing the rear part of the conversion frame 45 to the body 20, these bolts cooperating with flanged portions 48 respectively on the final drive housing 30. The members 46 are cross-braced by a plate 49. The forward portion of the conversion frame 45 is secured to a forward part of the body 20, in this instance the bell housing 24 of the intermediate housing 22. Since the rear part of the body 20 comprising the main case 23 and secondary housings 30 is substantially wider than the transverse extent of the bell housing 24, the frame members 46 converge forwardly to attaching portions 49a, each of which is appropriately apertured to receive securing means in the form of a cap screw or bolt 50. The bell housing 24 is provided at each side with an appropriate mounting pad 51 (Figure 4) for receiving the proximate securing means 50. By the means just described, the conversion frame 45 is rigidly, but removably, secured to the tractor body 20 in a manner that requires a minimum of alteration of the basic design of the body over that required for use of the body in a wheel tractor. As a matter of convenience, the body may originally be supplied with the mounting flanges 48 and mounting pads 51.

The particular body construction illustrated is of the type in which the longitudinal center line of the engine 21 and intermediate housing 22 is laterally offset to the left of the longitudinal center line of the main case 23. Thus, the longitudinal center line of the engine 21 and hood structure 20a will be to the left of the longitudinal center line between the traction units 35. In so far as concerns this relationship of the body to the tread of a wheel tractor, the design and the reason therefor are familiar to those versed in the art and are disclosed in the Maxon patent referred to above. These details form no part of the present invention, except in so far as the particular conversion frame 45 illustrated accommodates the arrangement.

Each frame member 46 is provided at longitudinally spaced portions thereof with supporting means including an upper mounting element or bracket 52. Each of these brackets is substantially identical, except for the adaptation of the forward brackets to the inward inclination of the frame members 46. Therefore, a description of one will suffice for all.

Each bracket includes an upper flanged portion which is rigidly secured to the frame member 46, as by a plurality of rivets 53. Each bracket includes a depending portion which terminates in a recessed portion 54, the recess of which is substantially one-half of a square formed on a transverse axis and set diagonally. The portion 54 provides the upper complementary half of mounting means including a lower complementary half 55 that is recessed in the manner of and to cooperate with the recess in the upper portion to provide a complete square for carrying a transverse supporting element in the form of a bar 56 of square cross section. The complementary portions 54 and 55 of each bracket 52 are appropriately secured together, as by bolts 57.

The connection of each transverse supporting bar 56 to the conversion frame 45 is of the type including shock-absorbing means between the bars and the brackets 52. In the present case, each shock-absorbing mounting includes a pair of complementary bushings 58 (Figures 3 and 8), preferably formed of rubber or similar resilient material and internally and externally recessed to accommodate the cross section of the bar 56 and the internal recessing of the complementary members or portions 54 and 55. Each pair of bushings 58 is securely held in the clamping portions of the proximate mounting 52 and this arrangement fixes the positions of the bars 56 and yet allows a certain desired flexibility of the bars with respect to the frame members 46. Each bar 56 is held against undesirable transverse displacement with respect to its supports or mountings 52 by means of a plurality of confining elements including a pair of washers 59 (Figure 5), one at each side of the proximate support 52. Each washer is rigidly secured, as by welding at 60, to the bar or element 56.

The bars or elements 56 project laterally outwardly at opposite sides of the body 20 and are thus provided with portions adapted to be carried or sustained by the track frames 36. Each track frame is provided with a pair of longitudinal members 64, each of which has a pair of longitudinally spaced supporting portions 65, each of which may comprise a pair of laterally spaced, longitudinally extending short angle bars as shown in Figures 6, 10 and 11. These angle bars are rigidly secured to the track frames in any suitable manner, as by welding at 36ª and 64ª (Fig. 11), and each angle bar is provided with a vertical flange having an upwardly opening recess 65ª shaped to accommodate the square cross section of the transverse bar 56. Each angle bar 65 has its horizontal flange formed with a pair of bolt holes 65ᵇ. The construction in this respect may be of any type desired and the specific details may vary.

The mounting portions comprising the angle bars 65 serve, through the intermediary of the bars 56 and conversion frame 45, to sustain the weight of the main body 20. The bars 56 are rigidly secured to the mounting portions 65, and thus to the track frames 36, by means preferably forming part of auxiliary power-transmitting devices designated generally by the numeral 70.

As best shown in Figures 7 and 8, each device takes the form of a fluid-pressure motor comprising a casing 71 having an interior formed with a chamber 72 and a cylinder 73. The cylinder is disposed with one end open for communicating with the chamber 72, and the opposite end of the cylinder is closed by a circular plate 74 (Figures 7 and 9) which is appropriately sealed with respect to the casing 71 and carried by a plurality of segmental pieces 75, which pieces are secured to the plate 74 as by cap screws 76 and which are retained in an annular groove 77.

A piston 78 is carried by the cylinder 73 for axial reciprocation therein between the closed end of the cylinder and the opposite end thereof which opens to the chamber 72. Power developed by the piston is transmitted externally of the casing 71 by power-transmitting means including a connecting rod 80, crank arm 81 and power take-off shaft or equivalent rockable member 82. The shaft or member 82 extends transversely of the casing 71 as respects the longitudinal axis of the cylinder 73 and is suitably journaled in the casing. The crank arm 81 is fixed to an intermediate portion of the shaft 82 within the chamber 72. The arm is further pivotally connected to one end of the connecting rod 80, as at 83. The other end of the rod 80 is connected at 84 to the piston 78.

In a preferred construction, there is a similar device 70 at the opposite side of the tractor and associated with the opposite traction unit 35. Since these devices are identical, a description of one will suffice for the other.

Each of the opposite ends of the device 70 is provided with a mounting portion 85 which is formed with a downwardly opening recess 86 of such size and configuration as to conform to the upper half of a sustaining bar 56 as a complement to one of the track frame mounting portions 65—65ª described above. Each portion 85 has a pair of bolt holes 85ª for cooperation with the bolt holes 65ᵇ in the mounting portions 65, further details of which will appear below. The device 70 is assembled in place with the mounting portions 85 spanning the front and rear transverse sustaining bars 56 and with these portions 85 cooperating respectively with the front and rear mounting portions 65 on the track frame (Figure 10). The device 70 is secured to the track frame by means cooperating with the mounting and supporting portions, a representative form of means being indicated in Figures 6, 10 and 11 as including a plurality of bolts 87 and nuts 87ª. Thus, the mounting portions 65 and 85 provide clamping means which not only secure the power-transmitting devices 70 rigidly in place but also secure the transverse bars 56 to the track frames 36.

As best shown in Figure 1, the location and disposition of the power-transmitting device 70 are such that the longitudinal or principal axis of the device is lengthwise of the track frame 36. Further, the device is located in the space between the sprocket 37 and front idler 38 and between the upper portion of the track frame 36 and the upper run of the track 39. Thus, the device is located in a place not ordinarily otherwise occupied and also in a place which is convenient from the standpoint of accessibility for both use and maintenance, which characteristic will be developed below.

The rockshaft 82 of each power-transmitting device projects laterally outwardly as an integral extension 90 that is preferably square in cross section. The rockshaft portion 90 thus extends laterally outwardly of the outermost longitudinal vertical plane of the track 39 (Figure 2), at which point it is available for use in moving or otherwise transmitting power to auxiliary attachments on the tractor.

A representative form of auxiliary attachment is shown in Figures 1 and 2 as comprising a carrier including a pair of laterally spaced, longitudinally running beams 91, one at each side of the tractor outwardly of and paralleling the respective traction unit 35. Each of the opposite ends of the front transverse bar 56 is extended laterally outwardly and is provided with a suitable supporting bracket 92. Each bracket is provided with a pivot 93 on a transverse axis which provides means for swingably mounting the forward end of the respective beam 91. The beams extend rearwardly of the tractor and are cross connected by a transverse beam 94. The latter beam may be used for the mounting of various types of tools, such as agricultural implements. The arrangement is such that the beams 91 may be extended forwardly from the pivot 93 to dispose the beam 94 transversely at the front end of the tractor, in which position the beam may carry tools, such as agricultural implements. The rear position of the carrier comprising the beams 91 and 94 is shown in full lines in Figures 1 and 2 and the front position is indicated in broken lines in Figure 1. It will be obvious, of course, without further illustration or description, that the beam 94 is suitable for the mounting of various types of agricultural implements and other auxiliaries.

The pivots 93 are coaxial on a transverse axis that is substantially midway between the front and rear ends of the tractor, thus facilitating disposal of the carrier 91—94 at either end of the tractor. Likewise, the rockshafts 82—90 are coaxial on a transverse axis substantially midway between the front and rear ends of the tractor. The relationship between the two transverse axes remains the same, whether the carrier extends forwardly or rearwardly.

For the purpose of supplying power developed by the fluid-pressure device 70 to the carrier, each rockshaft 82—90 carries a power-transmitting member or arm 95. Each arm 95 is connected to its proximate rockshaft 82—90 for rocking with the shaft. A representative type of connection is illustrated in Figure 1, wherein it is shown that the arm has a rectangular opening 96 which receives the square end 90 of the rockshaft. Securing means, such as a set screw and lock nut assembly 97, may be provided for fixing the arm to the rockshaft.

When the carrier is in its rear position so that the beams 91 extend rearwardly, the arms 95 also extend rearwardly. The arms are connected respectively to the beams 91 by means of power-transmitting links 98.

The fluid-pressure motor embodied in each device 70 is of the two-way type including two fluid-pressure-transmitting means or conduits 99 and 100, the former of which communicates with the chamber 72 at 101 and the latter of which communicates with the cylinder at 102. Fluid under pressure may be supplied selectively through either of the conduits by any appropriate means, such as a fluid pump driven by power derived from the engine 21, which type of arrangement is generally conventional and requires no further illustration or description here. However, the present fluid-pressure motor differs in at least one material respect from the usual fluid-pressure motor comprising a cylinder and piston. In motors of the type previously known, the motor is capable of developing more power in one direction than in the other direction, which follows from the fact that the piston rod extends through one end wall of the cylinder and the pressure area at the rod end of the cylinder is reduced by the area of the piston rod within the cylinder, which result does not occur at the opposite side of the piston. In the illustrated instance, this difference in pressure area at opposite ends of the cylinder is eliminated by the provision of the chamber 72 and the transverse rockshaft 82, since the connections between the piston 78 and rockshaft 82 are totally enclosed by the casing 71. Thus, the fluid-pressure motor has equal power in either direction. Although fluid-pressure motors of the earlier type are usually arranged so that maximum power is developed in the raising of a component comparable to the carrier 91—94, inasmuch as lowering of such component is then accomplished by gravity on the exhaust side of the motor, the provision of equal power is important in a case such as the present wherein the carrier, for example, is reversible and the fluid-pressure motor is not reversible, it being apparent that movement of the piston 78 in one direction will raise the carrier when the latter is in one position, but it takes movement of the piston in the opposite direction to raise the carrier when the latter is in its other position.

From the foregoing, it will be seen that the various aspects of the invention contribute to a unitary structure adapted for use in any tractor but particularly useful in connection with a tractor of the track-laying type. The conversion frame 45 is readily adaptable to convert the tractor from a wheel tractor to a crawler. The mounting of the conversion frame by means of the fluid-pressure device 70 and supporting bars 56 on the track frames 36 results in a compact construction that has wide flexibility for the purposes intended. As stated above, the U-shaped structure comprising the carrier 91—94 may be used for a wide variety of purposes and at either end of the tractor.

Other features and characteristics of the invention not specifically pointed out above will occur to those versed in the art, as will numerous modifications and alterations in the preferred construction illustrated, all of which may be achieved without departing from the spirit and scope of the invention as defined in the appended claims.

What is claimed is:

1. In a tractor having a longitudinal body carried between a pair of traction units each of the type including a pair of longitudinally spaced apart rotary elements and intermediate carrier means having longitudinally spaced supporting portions within the longitudinal spacing of said rotary elements, the improvement comprising: a pair of longitudinally spaced, transversely extending bars, each having opposite end portions sustained respectively on the supporting portions of the carrier means, and an intermediate portion sustaining the tractor body; means respectively mounting each end of each bar to the supporting portions of each of the carrier means, each of said mounting means including a lower clamping part; and a pair of power-transmitting devices, one for each traction unit, each device extending longitudinally of the respective carrier means and having longitudinally spaced portions providing upper clamping parts cooperating respectively with the related lower clamping parts; and means securing each pair of upper and lower clamping parts together to mount the power-transmitting devices respectively on the carrier means and to secure the end portions of said bars respectively to said carrier means.

2. In a tractor having a longitudinal body carried between a pair of traction units each of the type including a pair of longitudinally spaced apart rotary elements and intermediate carrier means having longitudinally spaced supporting portions within the longitudinal spacing of said rotary elements, the improvement comprising: a pair of longitudinally spaced, transversely extending bars, each having opposite end portions sustained respectively on the supporting portions of the carrier means, and an intermediate portion sustaining the tractor body; means respectively mounting each end of each bar to the supporting portions of each of the carrier means, each of said mounting means including a lower clamping part; and a pair of power-transmitting devices, one for each traction unit, each device extending longitudinally of the respective carrier means; and means including a plurality of upper clamping parts respectively complementary and secured to the lower clamping parts and having portions for carrying the power-transmitting devices.

3. For a track-laying tractor made up of a longitudinal unitary body of the so-called frameless type including a forward engine part, a rear main case, and an intermediate housing part, all rigidly secured together and disposed between a pair of longitudinal track units, each of the latter including a longitudinal track frame spaced laterally outwardly from the main body: an attachment frame installable and removable as a unit apart from the body and track units for mounting the body on and dismounting the body from the track units, comprising, a pair of longitudinally running, laterally spaced frame members opening upwardly to receive the body between them so as to lie respectively at opposite sides of the body, and each member being of such length as to have a terminal forward portion and a terminal rear portion positionable respectively proximate to the intermediate housing part and to the main case; means for detachably securing the forward portions respectively to opposite sides of the housing part independently of the engine part; means for detachably securing the rear portions respectively to opposite sides of the main case; a pair of transverse mounting bars spaced longitudinally of the frame members so as to lie beneath the main body but above the track frames, each having opposite end portions proximate respectively to and adapted to rest on the track frames; and means securing said bars to the frame members.

4. For a track-laying tractor made up of a longitudinal unitary body of the so-called frameless type including a forward engine part, a rear main case, and an intermediate housing part, all rigidly secured together and disposed between a pair of longitudinal track units, each of the latter including a longitudinal track frame spaced laterally outwardly from the main body: an attachment frame installable and removable as a unit apart from the body and track units for mounting the body on and dismounting the body from the track units, comprising, a pair of longitudinally running, laterally spaced frame members opening upwardly to receive the body between them so as to lie respectively at opposite sides of the body, and each member being of such length as to have a terminal forward portion and a terminal rear portion positionable respectively proximate to the intermediate housing part and to the main case; means for detachably securing the forward portions respectively to opposite sides of the housing part independently of the engine part; means for detachably securing the rear portions respectively to opposite sides of the main case; transverse mounting elements spaced longitudinally of the frame members, each having opposite end portions above and proximte respectively to the track frames and adapted to rest atop the track frames; and means securing said elements to the frame members.

5. For a track-laying tractor made up of a longitudinal unitary body of the so-called frameless type including a forward engine part, a rear main case, and an intermediate housing part, all rigidly secured together and disposed between a pair of longitudinal track units, each of the latter including a longitudinal track frame spaced laterally outwardly from the main body: an attachment frame installable and removable as a unit apart from the body and track units for mounting the body on and dismounting the body from the track units, comprising, a pair of longitudinally running, laterally spaced frame members opening upwardly to receive the body between them so as to lie respectively at opposite sides of the body, and each member being of such length as to have a terminal forward portion and a terminal rear portion positionable respectively proximate to the intermediate housing part and to the main case; means for detachably securing the forward portions respectively to opposite sides of the housing part independently of the engine part; means for securing the rear portions respectively to opposite sides of the main case; and means extending laterally outwardly from said frame members and connectible to and supportable on the track frames for sustaining the body on the track units.

6. For a tractor having a longitudinal unitary body of the so-called frameless type made up of a main case at one end, an engine part at the other end, and an intermediate elongated housing part interconnecting the main case and engine part, said main case including at each side thereof a secondary housing part carrying a transverse drive axle adapting the body to be carried in part by traction wheels as a conventional tractor: attachment means for converting the tractor to a track-laying type by supporting the body between a pair of track units respectively including longitudinal track frames and driving sprockets comprising, an upwardly opening, generally rectangular conversion frame including a pair of laterally spaced apart, longitudinally running side members adapted to receive the body between them so as to lie respectively along opposite sides of the body and of such length as to extend from first terminal end portions adjacent to said secondary housings to second terminal end portions adjacent to and independent of the engine part, said frame further including cross members projecting laterally outwardly from the side members at each side of said frame to reach out to and be sustained respectively by the track frames of the track units; and means for connecting the side members of the conversion frame at their first and second end portions respectively to the secondary housings and to the interconnecting housing.

7. For a tractor having a longitudinal unitary body of the so-called frameless type provided with front and rear ends and made up of a forward engine part, a rear main case part, and an intermediate elongated housing part rigidly interconnecting the engine and main case parts, said main case having at each side thereof a rigidly attached and laterally outwardly extending final drive housing including a drive axle for traction wheels when the body is ordinarily adapted as a conventional four-wheel tractor: attachment means for converting the tractor to a track-laying type in which the body is supported between a pair of track units respectively including longitudinal track frames and driving sprockets arranged with the driving sprockets positioned for connection to said drive axles and the track frames extending forwardly, said means comprising, an upwardly opening, generally rectangular conversion frame including a pair of generally longitudinal side frame members adapted to receive the body between them so as to lie respectively along opposite sides of the body and having terminal rear end portions for connection respectively to the final drive housings, said frame members converging forwardly to terminal front portions and having means for connection to a forward part of the body of less width than the transverse distance across the final drive housings; and sustaining elements carried by and crosswise of said side members and projecting laterally at opposite sides thereof to reach out and be supported respectively by the track frames.

8. In a tractor having a longitudinal body carried between a pair of traction units of the type including a pair of longitudinally spaced apart rotary elements and intermediate carrier means having longitudinally spaced supporting portions within the longitudinal spacing of said rotary elements, the improvement comprising: a pair of longitudinally spaced, transversely extending bars, each having a first end portion to be sustained on a supporting portion of one carrier means, a second end portion to be sustained on a supporting portion of the other carrier means, and an intermediate portion for sustaining the tractor body; a power-transmitting device having mounting elements spaced apart on the order of and arranged to be carried by the first end portions of the bars adjacent the one carrier means; means for securing said first end portions of the bars to the one carrier means, including portions respectively engaging the mounting elements of the power-transmitting device to fix said device relative to the bars; and means for securing the second end portions of the bars to the other carrier means.

JESSE G. LINDEMAN.

REFERENCES CITED

The following references are of record in the file of this patent:

UNITED STATES PATENTS

| Number | Name | Date |
|---|---|---|
| 1,398,382 | Lambert | Nov. 29, 1921 |
| 1,413,148 | Wickersham | Apr. 18, 1922 |
| 1,744,516 | Whitacre | Jan. 21, 1930 |
| 2,031,303 | Eberhard | Feb. 18, 1936 |
| 2,064,022 | Maloon | Dec. 15, 1936 |
| 2,091,464 | Baker et al. | Aug. 31, 1937 |
| 2,208,709 | Tjaarda | July 23, 1940 |
| 2,238,346 | Sorensen | Apr. 15, 1941 |
| 2,304,365 | McCormick | Dec. 8, 1942 |

FOREIGN PATENTS

| Number | Country | Date |
|---|---|---|
| 370,265 | Germany | Mar. 1, 1923 |